United States Patent [19]

Olsen

[11] 3,922,591

[45] Nov. 25, 1975

[54] HEATED WIRE SERVO MOTOR CONTROL SYSTEM

[75] Inventor: Everett O. Olsen, Wrentham, Mass.

[73] Assignee: The Foxboro Company, Foxboro, Mass.

[22] Filed: Dec. 4, 1973

[21] Appl. No.: 421,607

Related U.S. Application Data

[63] Continuation of Ser. No. 237,482, March 23, 1972, which is a continuation-in-part of Ser. No. 2,120, Jan. 12, 1970, abandoned.

[52] U.S. Cl. ............... 318/676; 318/687; 310/4.1; 337/140; 346/32
[51] Int. Cl.² .................. G05B 11/01; G05B 11/00
[58] Field of Search ........ 310/4.1; 337/140; 346/32; 318/676, 687

[56] References Cited
UNITED STATES PATENTS

| | | | |
|---|---|---|---|
| 2,004,421 | 6/1935 | Smulski | 310/4.1 X |
| 2,555,882 | 6/1951 | Guajardo | 310/4.1 X |
| 2,777,077 | 1/1957 | Lorini | 310/4.1 UX |
| 3,242,796 | 3/1966 | Strickler | 310/4.1 |
| 3,652,969 | 3/1972 | Willson | 337/140 |

*Primary Examiner*—T. E. Lynch
*Attorney, Agent, or Firm*—Parmelee, Johnson & Bollinger

[57] ABSTRACT

An electrical positioning device utilizing a temperature responsive material exhibiting contraction-elongation characteristics in response to an increase or decrease in temperature to vary the position of an output member. The temperature of the material is controlled by a null-seeking rebalance system. The positioning device is illustrated with a moving pen recording instrument, a ribbon-type indicator, and a valve actuator.

43 Claims, 8 Drawing Figures

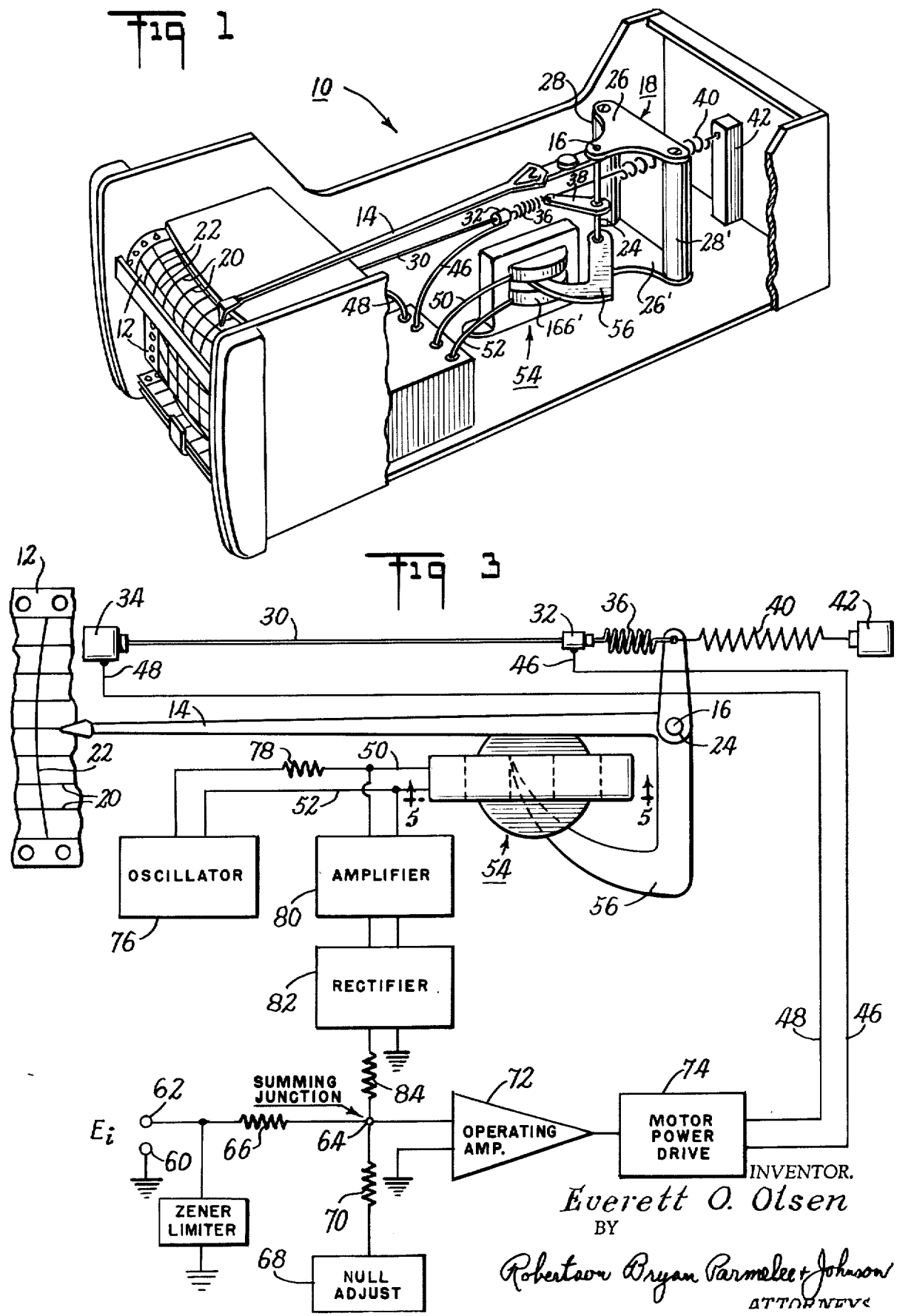

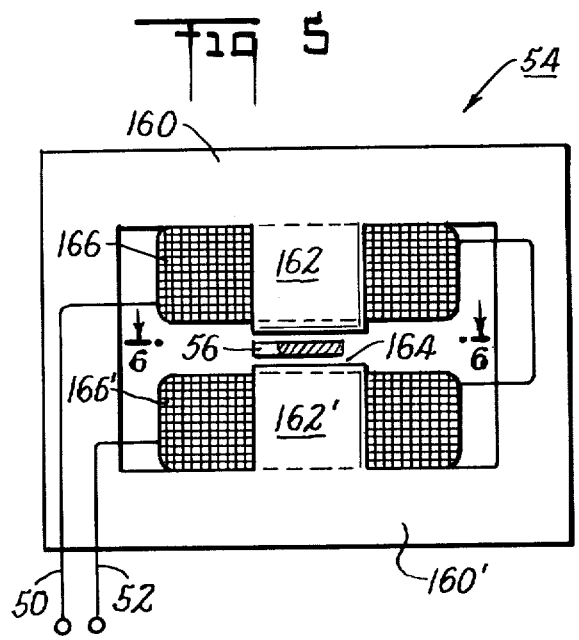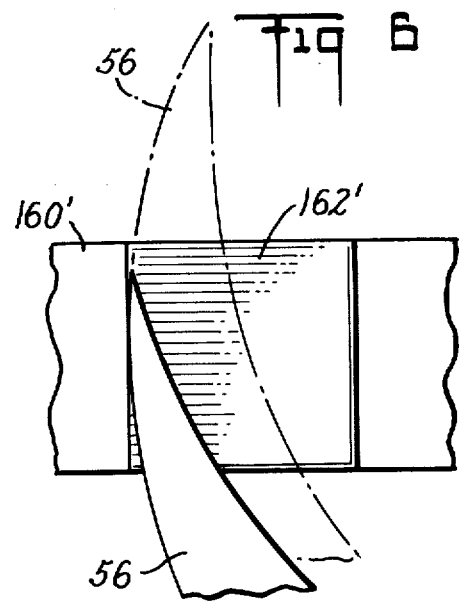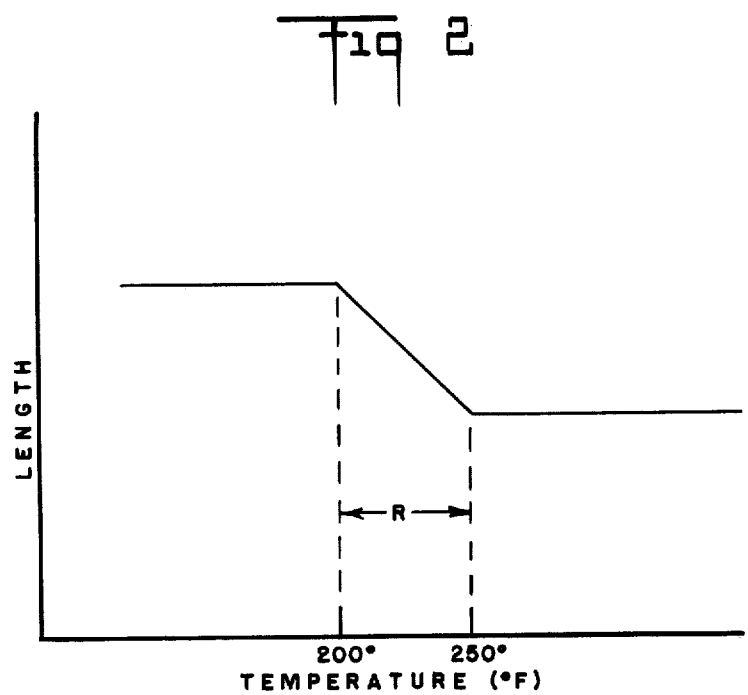

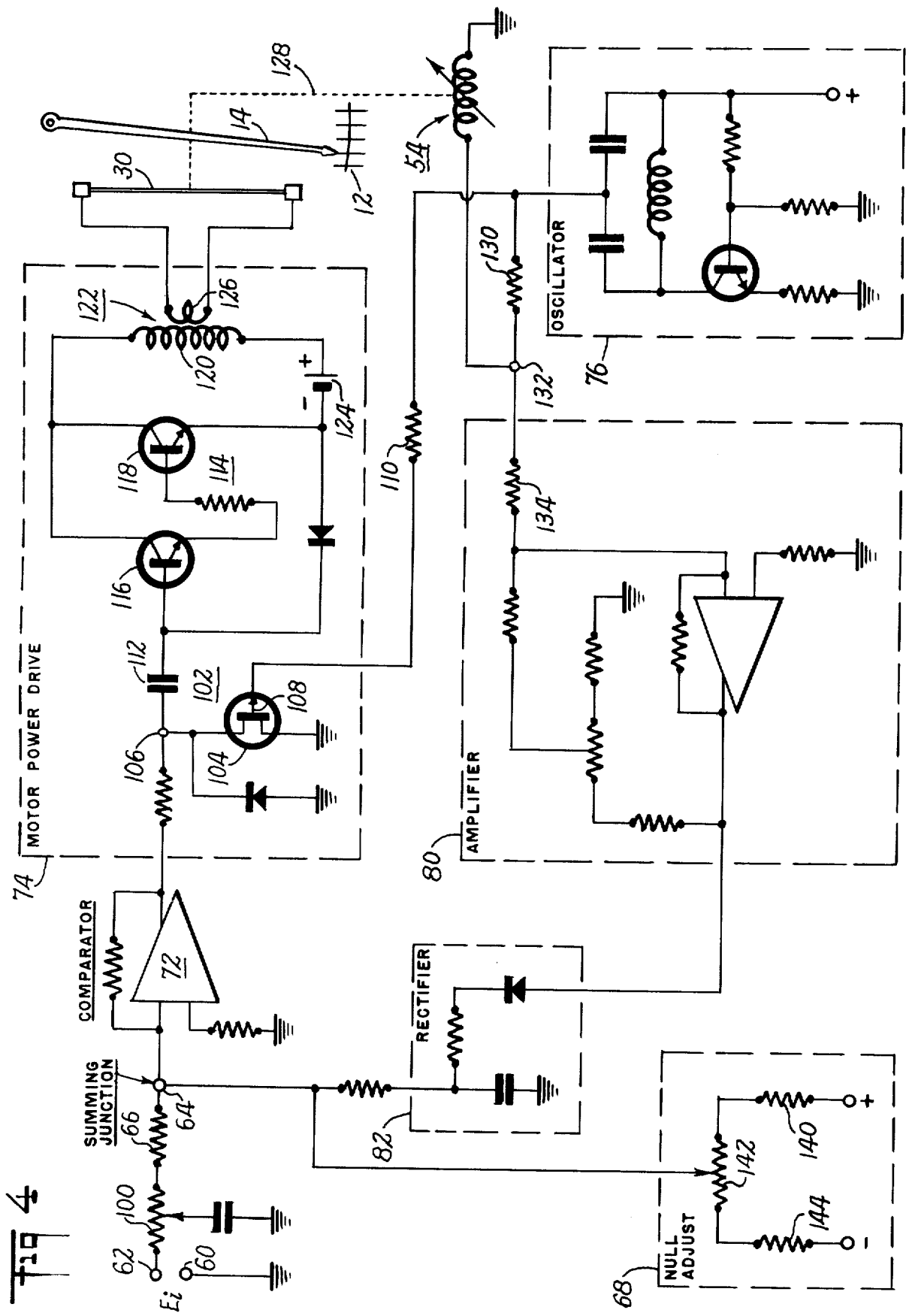

HEATED WIRE SERVO MOTOR CONTROL SYSTEM

This is a continuation, of application Ser. No. 237,482 filed Mar. 23, 1972 which is a continuation-in-part of my copending application Ser. No. 2,120 filed on Jan. 12, 1970, now abandoned.

This invention relates to an actuator for controlling the position of a member. More specifically, this invention relates to an actuator utilizing a temperature-responsive element for controlling a member such as an indicator or the like.

The positioning device disclosed herein utilizes a motor illustratively in the form of a wire made of a NickelTitanium compound which exhibits a controllable contraction and elongation characterstic in response to temperature variations over a preselected operating temperature range. This wire is stretched between two points and the temperature thereof is controlled in correspondence with an input signal. At temperatures below the operating range the wire maintains an effective constant length. When the temperature of the wire reaches the operating range, the wire commences to contract. This contraction continues as the wire temperature rises through the operating temperature range until the wire reaches a maximum operating temperature above which the contracting effect is no longer present. A cooling of the wire within the operating range provides a relaxation of the contracting forces, and tensioning means are automatically operative to maintain the wire taut as it elongates towards its original length. Sensing means responsive to the position of the output member serve through a feedback arrangement to control the temperature so as to adjust the output position with precision to correspond to an applied input signal.

In one embodiment of the invention, a recorder is provided utilizing a temperature-responsive wire operatively connected between a pen drive linkage and a mechanical "ground" point. An input signal is generated corresponding to a value to be recorded. This input signal is applied to an amplifier the output of which controls a current through the wire to heat it to a temperature within the operating range. The position of the pen is sensed and a signal representative thereof is negatively fed back to null the amplifier input and fix the wire heating current at the proper level to establish the desired pen position.

In another embodiment, a ribbon-type indicator is provided wherein the ribbon reel is actuated by a temperatureresponsive wire. The wire is supplied with a constant electrical current. The heating effect of this current is adjusted by selectively controlling the position of a heat sink placed in proximity to the wire. An input signal controls the position of the heat sink and thus the contraction and elongation of the wire to place the indicator at a desired position.

It has been found that certain preliminary processing of the wire can provide importantly beneficial results in its ultimate use. More particularly, the wire can with advantage be "exercised" through one or more operational cycles of extensive contraction and expansion, e.g. up to the limits of thermally-inducible dimensional change. As one example of such preparative processing, a Nitinol wire of about 8 inches in length and about .010 inches in diameter, initially observed to have a maximum contraction capability of only about ½% of its overall length, was exercised as described hereinafter.

The wire referred to above was alternately heated and cooled to effect a series of successive contraction/expansion cycles while under tension developed by a coiled spring connected to one end of the wire (in essentially the same mechanical arrangement and under approximately the same tension as when the wire subsequently was used as a positioning actuator in the recording instrument to be described in detail below). During the heating phase of each such exercising cycle, the wire was supplied with heat energy of about four times the amount required to obtain the initiallyobserved maximum contraction of ½%. Such over-heating of the wire did not produce a greatly increased contraction during any one exercising cycle, but the amount of contraction produced during each heating phase increased cumulatively with each successive cycle. After a series of about ten to twelve such cycles, the maximum contraction capability was found to have increased to approximately 3 to 4% of the overall wire length. Such increased contraction moreover was thereafter producible by the normal heat input (i.e., that heat input which initially developed a maximum of only about ½% contraction).

During the exercising procedure described above, the tension in the wire was increased during each cycle beyond the normal tension, e.g. up to perhaps about 150% of the normal maximum tension when the amount of contraction was increased by heating the wire beyond the usual amount (thereby expanding the tension spring beyond its normal range). The tension force applied during the exercising was approximately one pound, e.g. varying from about 0.8 pounds to 1.2 pounds as the wire contracted against the tension spring.

The wire was found to have increased in length a small amount during each such exercising cycle, somewhat in the nature of plastic "creep," and resulting in a permanent elongation. After each set of three or four cycles, the creep was sufficient to warrant repositioning the anchor point of the wire, in order to continue providing the desired wire tension from the tension spring.

It has been discovered that, once the wire has been properly conditioned to achieve maximum contraction by exercising as described herein, problems with further permanent elongation can be avoided by restricting or limiting the operational contraction of the wire to substantially less than the maximum possible contraction. Such operational contraction (i.e., the maximum contraction experienced during usage of the wire in a commercially operable instrument or device) desirably should be limited to less than one-half of the maximum possible contraction of the wire, and preferably to less than one-quarter of the maximum possible contraction. This limitation insures consistent results, whereby the positioning produced by the wire will be uniform for identical control signals, without effective errors due to further creep of the wire material. In recorder apparatus of the type to be described, the wire contraction should be restricted to no more than 2% of the overall length of the wire, and perhaps less, depending upon expected usage. With such limitation, the wire can be operated through very large numbers of cycles without exhibiting any significant creep or further elongation, beyond that initially experienced during the exercise preparation discussed above.

Accordingly, it is an object of this invention to provide a superior positioning device responsive to an electrical input signal. A more specific object is to provide such a positioning device of simple construction and high reliability.

Other objects, aspects and advantages of the invention may be understood from a description of several preferred embodiments of the invention considered together with the drawings wherein:

FIG. 1 is a perspective view of a chart recorder utilizing a temperature-responsive wire as the actuator for an indicator pen;

FIG. 2 is a diagram indicating in idealized form, the temperature response characteristics of the material used as the motor in the recorder of FIG. 1;

FIG. 3 is a schematic block diagram of the chart recorder of FIG. 1;

FIG. 4 is a more detailed electrical schematic of the chart recorder of FIG. 1;

FIG. 5 is a section view of a position sensing element employed with the apparatus illustrated in FIG. 1;

FIG. 6 is a detail horizontal section of the position sensing element of FIG. 3 taken along the line 5—5;

Figure 7:
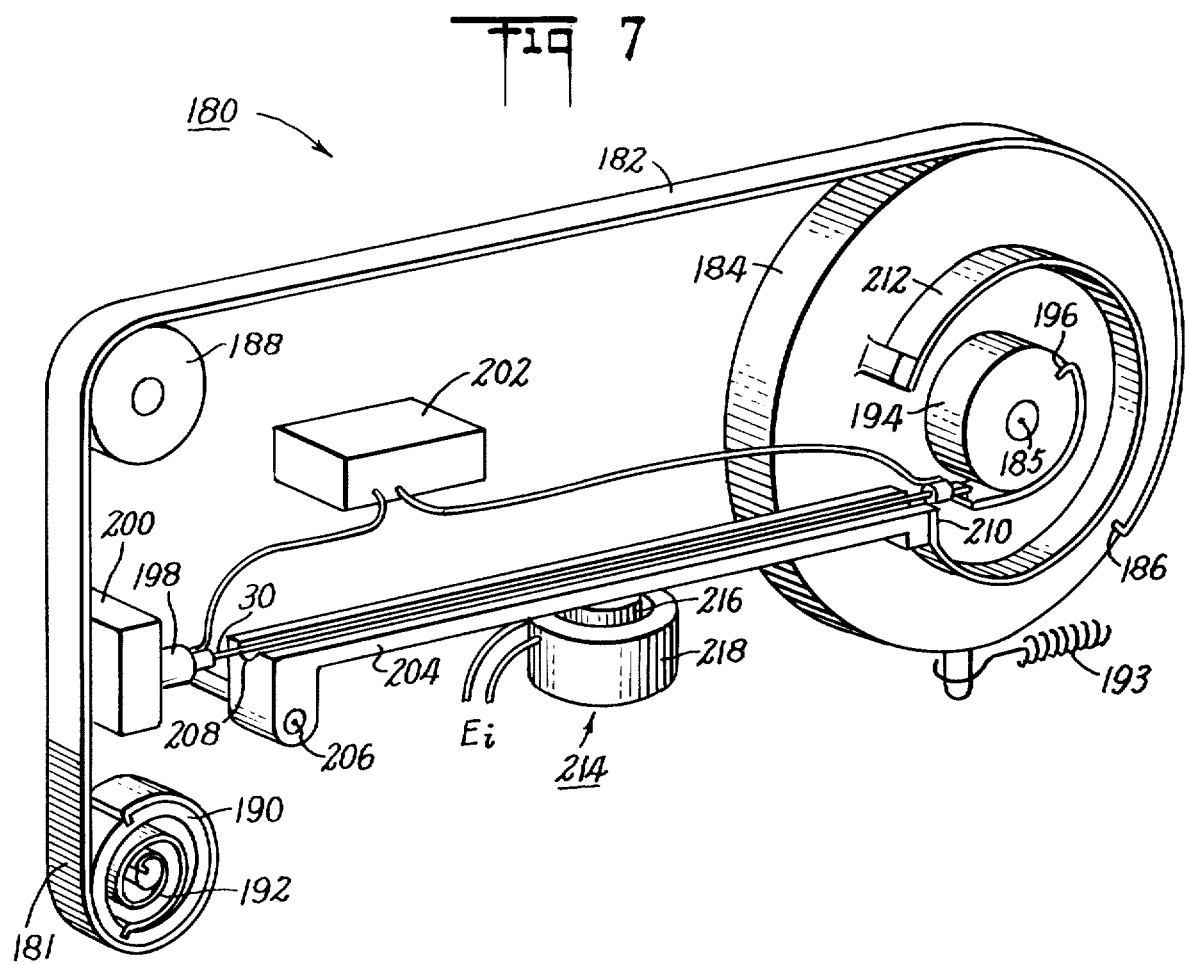
FIG. 7 is a perspective view of a ribbon indicator device driven by a temperature-responsive wire.

With reference to FIG. 1, a chart recorder 10 is illustrated. The chart recorder includes a strip of calibrated recording material 12 mounted for movement past a recording pen 14 pivotally supported at pivot axis 16 by a pen mounting structure 18. The recording material 12 may be provided with calibration lines 20 and time lines 22 to measure an input signal as is conventional with chart recorders. The mechanism used to move the recording material 12 past the pen 14 is of conventional design and does not form a part of the invention.

The pen 14 is fastened to a shaft 24 pivotable about axis 16. The shaft 24 is vertically supported between a pair of parallel spaced brackets 26-26'. The brackets 26-26' are horizontally aligned and vertically stacked with suitable spacers 28-28'.

The pen 14 is positioned by an electrical actuator basically comprising a temperature-responsive wire 30 formed of an alloy exhibiting a martensitic transformation creating an internally generated change in length over a predetermined temperature range. In the specific embodiment to be described, the wire is formed of a mixture of Nickel and Titanium, commonly referred to as Nitinol. (For detailed information regarding such material, see U.S. Pat. Nos. 3,391,882 and 3,403,238.) Briefly, and referring to FIG. 2, this material, when properly preconditioned, will contract in length as its temperature rises through the operating range R. The characteristics of the curve can be controlled by metallurgical techniques, both as to the size and positioning of the operating range, and the rate of size change with temperature. For example, the material may be preconditioned so that contraction begins at about 200°F and ends at about 250°F.

Referring now also to FIG. 3, the wire 30 is heated to operating temperature by electric current passing axially down the wire and supplied through insulated terminals 32-34. The second terminal 34 is secured to the chassis of the recorder 10. The first terminal 32 is connected through an overload safety spring 36 (rigid during normal operation) to a lever arm 38 fastened on the pen shaft 24. The lever arm 38 is biased in a clockwise direction by a tension spring 40 generally aligned with the wire 30 and attached to a vertical post 42 secured to the chassis of the recorder 10.

The pen recorder and its associated electrical control circuitry will now be described briefly. Referring to the lower left-hand corner of FIG. 3, an input signal $E_i$ is applied to input terminals 60-62 and directed through a resistor 66 to a current summing junction 64. Other signals into the summing junction 64 are from a null pen adjust circuit 68 applied through a resistor 70, and a feedback signal from a variable-inductance pen position sensor 54 (to be described in more detail below) applied through a resistor 84. The output of the summing junction 64 is connected to an operational amplifier 72 to control a motor power supply network 74 connected through leads 46-48 to the wire 30. When $E_i$ changes, the wire current is correspondingly altered to vary the wire length in the correct direction.

An oscillator 76 provides an exciting current through a resistor 78 to the variable-inductance sensor 54 via leads 50 and 52. The inductance across wires 50-52 is sensed to produce an a.c. position signal which is amplified by an a.c. amplifier 80. The amplified output is rectified by rectifier 82 to produce a d.c. voltage which is applied via resistor 84 to the summing junction 64 with a polarity opposite to that of input signal $E_i$. Hence, the pen position signal is effectively negatively fed back to the amplifier 72 to cause the pen to be moved to (or held at) the desired position determined by the input signal $E_i$. The null adjust circuit 68 provides a bias signal which determines the pen position in the absence of an input signal $E_i$.

Considering the operation of the pen recorder of FIG. 3, assume that an input signal $E_i$ is of such magnitude that it causes an increase in the supply of power to the wire 30, thereby raising its temperature. The wire 30 contracts, forcing a counterclockwise pivoting motion of the pen 14 about the pivot axis 16. The change in pen position is sensed by the variable inductance 54 which in turn produces an increase in the feedback signal. The heating power to the wire 30 is correspondingly reduced until it reaches the level where the pen deflection corresponds to that called for by the input signal. Reversely, if the input signal is reduced, the motor power is reduced to relax and elongate the wire material, aided by the tension spring 40. As the wire elongates, the pen 14 is pivoted clockwise to the position called for by the altered input signal.

As noted previously, the wire contraction/expansion during operation advantageously is restricted to a predetermined fraction of the maximum temperature-responsive dimensional change of which the material is capable, in order to avoid problems with permanent elongation. The operational contraction/expansion range for full scale output motion should be less than one half the maximum, and it is preferred to restrict the operational range to less than one-quarter of the maximum, as a safeguard in applications where very large numbers of operational cycles are likely.

Thus, in the recording instrument described herein, the amount of wire contraction required to move the pen from one end to the other of its chart scale should be less than one-half and preferably less than about one-quarter of the maximum contraction of which the wire is capable. To insure against inadvertent over-contraction, suitable limits can be placed on the applied input signal, as by connecting a Zener diode limiter circuit between the measurement input terminals 60, 62 to prevent the applied signal from exceeding that required to move the pen full scale (or a little beyond).

For wires which have been processed to provide a maximum contraction of 4%, the operational contraction/expansion range required to produce full scale output should be limited to no more than 2% of overall wire length, and preferably to no more than 1% of overall wire length in applications such as the disclosed pen motor.

Referring now to the circuit of FIG. 4, the input signal $E_i$ is applied to terminals 60–62 and coupled through a potentiometer 100 and resistor 66 to the summing junction 64. The output of the amplifier 72 is applied to the motor power supply network 74. The motor power network 74 is formed of a chopping circuit 102 which transforms the d.c. signal from the amplifier 72 to a pulsed d.c. signal. The chopper circuit 102 includes a field-effect transistor (FET) 104 in parallel connection across the output of amplifier 72 at junction 106. The FET 104 has its drain and collector electrodes coupled between junction 106 and ground and its control electrode 108 connected to the oscillator 76 through a resistor 110.

Thus, the d.c. signal at the output of the amplifier 72 is converted into a pulsed d.c. signal. This signal is coupled through a capacitor 112 to an amplifier 114 formed of a pair of series-connected transistors 116–118. The output of this amplifier 114 is coupled to the primary winding 120 of a step-down transformer 112, in series with the amplifier power supply 124. The secondary winding 126 of the transformer 122 is in turn coupled to the wire 30 to supply electrical heating power thereto.

In the operation of the motor power network 74, positive going pulses are produced by the chopping network 102. These positive pulses have magnitudes proportional to the error signal at the summing junction 64 and are coupled by the capacitor 112 to the base of the first transistor 116 to cause both transistors 116–118 to conduct. Conduction through the transistors draws current through the primary 120 from the d.c. supply 124 to induce a secondary current and supply power to the wire 30.

The heating of the wire 30 is accompanied by a contraction thereof and as indicated by the horizontal dashed line 128 a pivot motion of the pen 14 is obtained. The variable-inductance device 54 senses the position of the pen 14 as suggested by the downward continuation of the line 128. A signal from the oscillator 76, at a frequency of approximately 20 Khz, is applied through a resistor 130 to the inductance 54; these two circuit elements together serve as a voltage divider having an output terminal 132. The voltage at this output terminal is coupled through a resistor 134 to the amplifier 80.

Variations in the inductance of sensor 54 cause changes in the a.c. voltage at terminal 132 and thus produce corresponding changes in the input signal to the amplifier 80. Such changes are reflected in the output of the amplifier 80 which is rectified at 82 to produce a d.c. signal corresponding in magnitude to the sensed position of the pen 14. The amplifier 80 and oscillator 76 circuits are of conventional design, with further description thereof not being necessary for an understanding of the operation.

The null adjusting circuit 68 supplies an input voltage to the summing junction 64 corresponding to the desired null position of the pen. The null adjusting circuit includes in series connection, resistor 140, potentiometer 142, and resistor 144, connected between positive and negative power supply voltages.

The pen position sensor 54 comprises a variable-inductance device composed of a magnetic circuit interrupted with an air-gap. A selectively shaped conductive armature such as the hook-shaped armature 56 in FIG. 1 is attached to the shaft 24 and is mounted for movement in the air-gap in response to pivoting motions of the shaft 24. The armature prevents the passage of magnetic flux through the horizontal area of the air-gap it occupies, thus increasing the reluctance of the air-gap in proportion to such occupied area, and correspondingly reducing the total amount of flux in the magnetic circuit. An increase in armature insertion increases this masking effect and correspondingly reduces the inductance of the magnetic circuit; armature withdrawal from the gap increases the inductance.

Contraction of wire 30 will cause a counterclockwise rotation of the shaft 24 accompanied by a withdrawal of the armature 56 from the air-gap. The withdrawal of the armature increases the amount of magnetic flux permitted to pass across the gap thus increasing the inductance across the wires 50–52. Decrease in the temperature of the wire 30 is accompanied by a slackening thereof which is taken up by the contraction of spring 40 thus causing a clockwise rotation of the shaft 24. The clockwise shaft rotation produces an increased penetration of the armature 56 into the air-gap reducing the flux passing across the gap and correspondingly reducing the inductance.

FIG. 5 illustrates a sectional view of the pen position sensor 54. The pen position sensor is formed of a magnetic circuit in the shape of a pair of facing E cores 160–160' with the center pole legs 162–162' of the E being slightly shortened to provide an air-gap 164. The facing poles 162–162' of the E cores are surrounded with windings 166–166' arranged to provide aiding magnetic fields when energized by an electric current from the oscillator 76. A portion of the armature 56 is shown protruding within the air-gap 164 between the poles 162–162'. The armature 56 is made of a conductive material such as copper, to mask a portion of the magnetic flux directed across the gap. At relatively high frequencies of the oscillator, the flux intercepted by the protruding portion of the armature 56 generates eddy currents therein which serve effectively to nullify flux passing between the poles 162–162' in that region. Since this "shadow" effect of the protruding armature 56 varies as the pen 14 changes its position, the amount of flux masked is changed, producing in turn a variation of the inductance between the leads 50–52. A high inductance is obtained when the armature 56 is virtually removed from within the gap 164 and provides a maximum signal to the amplifier 80, and a low inductance corresponding to a maximum insertion of the armature 56 in the air-gap 164 provides a minimum signal to the amplifier 80.

FIG. 7 illustrates an indicator apparatus 180 which has a movable ribbon 182 actuable by a temperature-responsive wire 30. The ribbon has a colored portion 181 cooperable with a stationary scale (not shown) which overlies the ribbon, at the front of the instrument. The ribbon 182 is wound on a drive spool 184 rotatable about an axis 185. The ribbon is attached to this spool at a location 186, and extends away therefrom over an idler spool 188 to a wind-up spool 190. This wind-up spool is spring-tensioned with a suitable coaxial spiral spring 192 so as to maintain the ribbon 182 in tension at all times. All of the spools rotate about pivot axes that are substantially parallel to one another and the spools are mounted substantially coplanar with one another for high density packaging.

The drive spool 184 is provided with a drum portion 194 to which at a selected radial location 196 one end of the temperature-responsive wire 30 is attached so as to apply a torque to this spool when the wire contracts. A spring 193 biases the spool 184 counterclockwise to elongate the wire 30 when its temperature is lowered. The remote end of the wire 30 is attached to an insulated terminal 198 connected to the frame 200 of the indicator housing. The attachment point 196 of the wire to the drum 194 is substantially closer to the axis 185 than ribbon attachment point 186. This provides a mechanical amplification of the wire movement proportional to the ratio of the radii of locations 186 and 196.

A power supply 202 is provided to continuously excite the wire 30 with an approximately constant current sufficient to heat the wire to within its operating temperature range. A longitudinal heat sink 204 is placed adjacent the length of the wire motor 30 and is pivotally mounted about an axis 206 at a location near terminal 198. Heat sink 204 is provided with a longitudinal groove 208 sized to receive the wire 30 and serves to enhance the influence of the heat sink 204 on the temperature of the wire 30.

The heat sink 204 is attached to one end 210 of a spiral spring 212 arranged to provide an upward force on the heat sink 204 tending to move it towards the wire 30. This upward force is counterbalanced by a force obtained from an electro-magnetic force motor 214 placed at a suitable location along the heat sink 204. The force motor 214 is of the voice-coil type, i.e., it includes a movable armature 216 attached to the heat sink 204 and having a current-carrying coil disposed in the field of a fixed permanent magnet 218. An input signal $E_i$ provides a current to the coil winding to tend to pivot the heat sink 204 away from the wire 30.

In the operation of the indicator apparatus 180 of FIG. 7, assume first that the forces on the heat sink 204 are in balance. The input signal $E_i$ to the force motor 214 then is increased to a new level to change the scale reading. This increase in force from motor 214 draws the heat sink 204 in a downward direction (clockwise around its pivot 206) away from the wire 30. The movement of the heat sink 204 away from the wire 30 causes the temperature of the wire to rise. The wire thereupon contracts, causing the drive spool 184 to rotate clockwise and wind more ribbon onto the spool 184 to raise the colored segment 181 of the ribbon. The drive spool 184 will rotate until the increase in upward force of the spiral spring 212 rebalances the increased force of the force motor 214.

With a decrease of the input signal $E_i$, the force applied by the motor 214 is decreased permitting the sprial spring 212 to move the heat sink 204 closer to the wire 30. This closer approach by the heat sink drops the temperature of the wire which thereupon is lengthened under action of the spring 193. A balanced condition between the force motor 214 and the spiral spring 212 is re-established with the ribbon 182 in a new position.

The instrument can be operated throughout its full range with essentially negligible motion of the heat sink in comparison with ribbon motion, thereby assuring accurate readings even with moderate fluctuations in current supplied by power source 202, or other variations resulting from environmental effects such as changes in temperature and the like.

Figure 8:
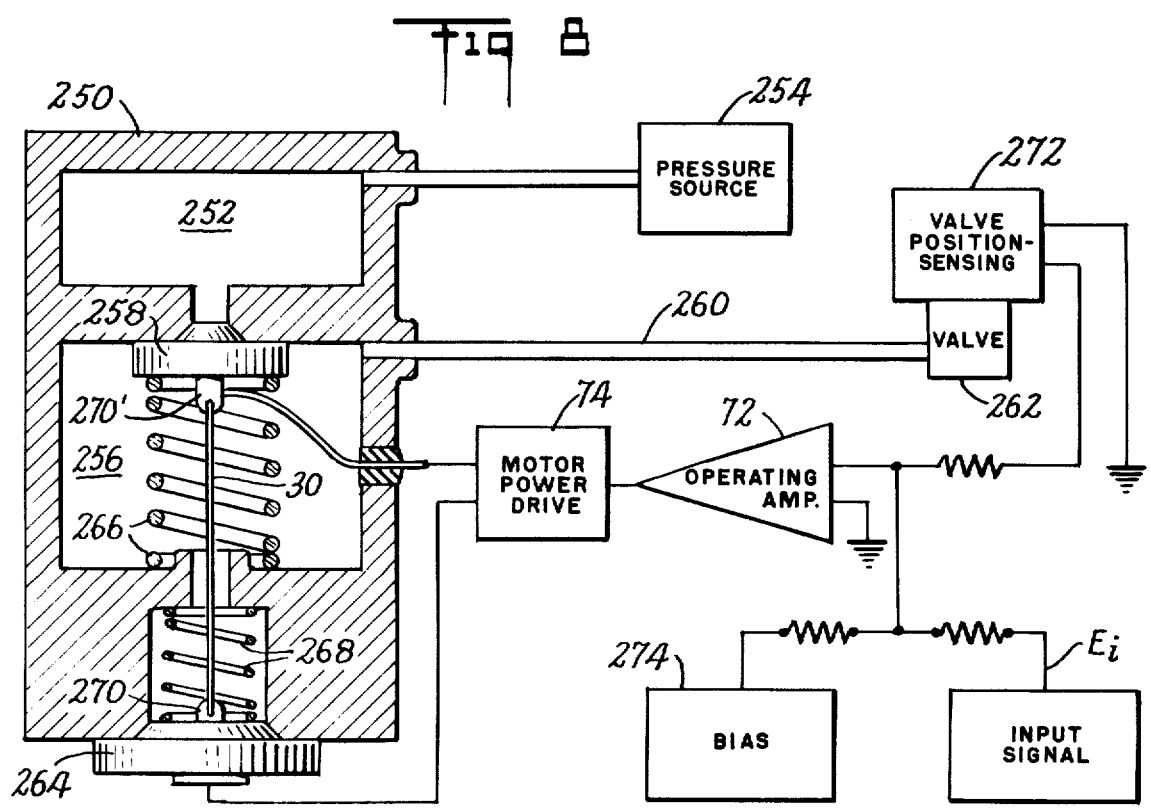
FIG. 8 is a sectional view of a current-to-air transducer utilizing a temperature-responsive wire for actuation.

FIG. 8 illustrates still another embodiment of the invention wherein a temperature-responsive wire 30 is used to actuate a pneumatic valve positioning system wherein a valve position is established in correspondence with an input voltage. This pneumatic system comprises a valve body 250 having a first chamber 252 connected to a source 254 of air under pressure. This first chamber 252 communicates with a second chamber 256 through a first valve 258. The second chamber 256 communicates through an output conduit 260 with a process valve 262 whose position is to be controlled by the pneumatic system. The second chamber 256 also communicates through a second valve 264 to atmosphere.

The first valve 258 is normally closed by a compression spring 266. A temperature-responsive Nitinol wire 30 is connected between electrically insulated terminals 270–270' located on the valves 264 and 258 respectively. The second valve 264 is urged towards open condition by a second compression spring 268, but during static condition this valve is held closed by the tension in wire 30. This second spring 268 is weaker than the first spring 266, and thus cannot by itself produce sufficient force to open valve 264 when the wire 30 is under tension.

The wire 30 is so sized that at a particular temperature (and thus length thereof) both valves 258 and 264 are closed, as shown in FIG. 8. At a higher temperature, and thus a shorter length, the wire pulls the first valve 258 open, with the second valve 264 held firmly closed against its seat. Opening of the first valve 258 permits high pressure air from source 254 to pass through the valve 258, chamber 256 and conduit 260 so as to alter the position of the process valve 262.

The change in the position of valve 262 is sensed by a valve position-sensing element 262 such as the previously described variable-inductance sensor 54 used with the embodiment in FIG. 1. This valve position-sensing element 272 produces a feedback signal which, in combination with the input signal, $E_i$, and a bias signal from a bias source 274, is applied to an operational amplifier 72 to control the heating power to the wire 30 from a motor power drive circuit 74.

In the operation of the valve positioning system, first assume $E_i$ and the bias signal provide a current to the wire 30 maintaining both valves 258 and 264 closed with the pressure in chamber 256 holding the process valve 262 at the desired position. Assume further that the input signal $E_i$ then is increased to establish a different position of valve 262. The increase of the input signal increases the power supplied to the wire 30 and results in a contraction thereof to open the first valve 258, and thereby alter the position of process valve 262. The change in the valve position is sensed by element 272 which feeds back a signal of a polarity which counters the effect of the input signal $E_i$ whereby the motor current reduces and allows the tension of the wire 30 to reduce. Ultimately, rebalance conditions will obtain, with a closure of the first valve 258 when the process valve 262 has reached the desired new position.

Suppose that a change in position of valve 262 requires a reduction in the pressure in chamber 256. This is accomplished by reducing the input signal $E_i$ which correspondingly reduces the current to the wire 30. The wire 30 thereupon elongates under action of the second spring 268 and the second valve 264 is opened permitting pressure in the second chamber 265 to drop towards atmospheric. As the pressure in the second chamber decreases, the valve 262 changes position and this change is sensed by the valve position element 272 to alter the feedback signal to counter-balance the reduction of the input signal. When a rebalance of the signals into the amplifier occurs, the motor drive power stabilizes at the level where both first and second valves 258 and 246 are closed, and the pressure in the second chamber is at the reduced level needed to maintain the valve 262 at the new position.

Precision operation of this valve positioning system is enhanced by using a high-gain amplifier 72 adapted to vary the motor drive circuit 74 (and thus the wire temperature) throughout its full range with only a small change in input signal to the amplifier, such as less than 1% of the operating range of the instrument. For example, if the input signal source $E_i$ has a range of 0–10 volts, to swing the process valve 262 from fully closed to fully open, an input signal swing to amplifier 72 of less than 100 millivolts should suffice to swing the wire current through its operating range, i.e., from a level producing a wire temperature for minimum contraction (such as 200°F, FIG. 2) to a wire temperature providing maximum contraction (e.g., 250°F, FIG. 2). It may also be noted that this system avoids any need for a constant air bleed. Thus, it can significantly reduce the capacity of air compression required in industrial plants.

Actuator apparatus as described hereinabove using Nitinol as the primary source of motive power provides important advantages over prior art devices. For example, Nitinol produces a significantly greater amount of physical displacement for a given volume of material, and for a given amount of heat supplied. Elongations in the range of close to 5% can be achieved with Nitinol, although in certain applications it may be advantageous to limit the output motion to a somewhat smaller percentage to assure consistently accurate results. Nitinol also is advantageous in producing a quite high force level for a given amount of material and heat energy. Also, output movements can be achieved with relatively small time lags. And such desirable characteristics can be attained with structural arrangements which are relatively simple, and which thus can be manufactured for modest cost to operate reliably for long periods of time.

I claim:

1. Positioning apparatus for moving an output device to a position corresponding to an applied control signal which signal is settable to any value within a predetermined range of values, said apparatus being adapted for use with applications where relatively large movements are required, and comprising:

an element formed of an alloy exhibiting a martensitic transformation over a temperature range wherein a variation in temperature in one scale direction produces an internally generated dimensional change of the element and a variation in temperature in the reverse scale direction relaxes the element;

force-producing means arranged to apply to said element an external force opposing said internally generated dimensional change, said force being insufficient to prevent said internally generated dimensional change but sufficient to produce a dimensional change of said element in the opposite direction when the element is relaxed in response to a change in temperature in said reverse scale direction;

input signal means to receive said control signal; and means connected to said input signal means and responsive to the applied control signal to controllably alter the temperature of said element to any temperature within said temperature range, and to maintain such temperature as required to hold said output device at the position corresponding to the value of said control signal, with internally generated dimensional changes and opposite external-force-produced dimensional changes serving together cooperatively to provide contraction and expansion of said element of relatively large magnitude as required to position said output device to any position within the predetermined range of positions in correspondence to the magnitude of said control signal.

2. Apparatus as claimed in claim 1, wherein said element is formed of an alloy of nickel and titanium.

3. Apparatus as claimed in claim 2, wherein said element is a wire.

4. Apparatus as claimed in claim 1, including a position-responsive device operable with said element to produce a position signal proportional to the output position of the element;

means for developing an input signal representing the desired output position of the said element; and means responsive to the difference between said two signals for automatically adjusting the temperature of said element to effect the desired output position thereof.

5. Apparatus as claimed in claim 1, wherein said alloy contracts with an increase in temperature in said range and relaxes with a decrease in temperature in said range.

6. Apparatus as claimed in claim 1, wherein said force-producing means comprises a spring.

7. The method of reversibly moving an object to permit the object to be controllably positioned and repositioned to any selected position within a range of positions, comprising the steps of:

A. altering in one scale direction the temperature of an element which is connected to said object and is formed of an alloy exhibiting a martensitic transformation which produces an internally generated dimensional change in response to such temperature alteration, thereby moving said object in a given spatial direction;

B. limiting the temperature alteration of said element in said one scale direction as said object reaches a first preselected position within said range of positions and which is not at an extremity of said range of positions;

C. altering the temperature of said element in a reverse scale direction to effect a relaxation of the element;

D. limiting the temperature alteration of said element in said reverse scale direction as said object reaches a second preselected position within said range of positions and which is not at an extremity of said range of positions; and E. applying to said element in both steps A and B an externally-developed force opposing said internally generated dimensional changes and of sufficient magnitude to cooperate with said element while in steps C and D to effect a balance of forces to fix the output of the element to said second preselected position within the operating range of positions.

8. A prime mover arranged to move an object reversibly through a wide range of positions and to position the object at any selected location in said range, said prime mover comprising:
a motion-producing element formed of an alloy exhibiting a martensitic transformation over a temperature range wherein a variation in temperature in one scale direction tends to produce an internally generated dimensional change of the element and a variation in temperature in the reverse scale direction tends to relax the element; and
control means for adjusting the temperature of said element and controlling the dimension thereof, said control means including means to selectively alter the temperature of said element and controllably set the temperature thereof to any value within said range in accordance with a desired output position.

9. A prime mover as in claim 8, wherein said control means comprises means responsive to the output position of said element to develop a position signal;
means to develop an input signal representing the desired output position; and
means responsive to the difference between said two signals for altering said temperature of said element and to set it at a value providing said desired output position.

10. A positioning device comprising:
a temperature-responsive wire element formed of a martensitic transformation alloy which changes in length with changes in temperature within a predetermined operating range;
means for passing a current through said wire to heat it to a temperature within said operating range;
means connecting said wire to an output member to be positioned thereby in accordance with changes in length of said wire;
control means responsive to an input signal for adjusting the amount of heat in said wire so as to exercise control over the position of said output member, said control means comprising means to adjust the rate of heat flow from the wire;
means responsive to the position of said output member for producing a feedback signal; and
means for directing said feedback signal to said control means to oppose the influence of said input signal so as to position said output member in accordance with the magnitude of said input signal.

11. A positioning device comprising:
a temperature-responsive wire element formed of a nickel-titanium alloy exhibiting a martensitic transformation which changes in length with changes in temperature within a predetermined operating range;
means for passing a current through said wire to heat it to a temperature within said operating range;
means connecting said wire to an output member to be positioned thereby in accordance with changes in length of said wire;
a heat sink mounted for relative movement towards and away from the wire;
a force motor responsive to an input signal for applying a moving force to said heat sink to adjust the amount of heat in said wire so as to exercise control over the position of said output member; and
means connected to the output member for developing a rebalance force applied to said heat sink in accordance with the position of the output member.

12. Apparatus as claimed in claim 11, wherein said output member comprises an indicator ribbon;
a ribbon drive spool to which said ribbon is fastened at a first radial position;
said wire being operatively fastened to said drive spool;
and spring means secured to said spool for developing said rebalance force.

13. Apparatus as claimed in claim 12, wherein said wire is fastened to said spool at a position closer to the spool axis than said first radial position.

14. Apparatus for producing a visual indication responsive to temperature comprising an element made of a mixture of nickel and titanium exhibiting a martensitic transformation adapted to change the size of said element with changes in temperature; means connected to said element to influence the temperature-responsive size-changing action of said element to set the size thereof to any size, within a predetermined operating range of sizes, in response to changes in the temperature; indicator means connected to said element to be moved thereby in response to said change in size; and a scale positioned adjacent said indicator means to provide a visual reading of the position thereof.

15. In prime mover apparatus having a principal element of material exhibiting a temperature-responsive martensitic transformation which is capable of producing a dimensional change of a predetermined maximum amount in response to a change in temperature over a corresponding temperature range, the apparatus further including means to control the temperature of said element in accordance with an input signal, whereby the element dimension can be controlled so as to alter the position of a member to which said element is operatively coupled;
the improvement wherein the operational temperature range to which said element is subjected is limited to a preselected range which develops a dimensional change of said element of less than said maximum amount.

16. Apparatus as claimed in claim 15, wherein said element is a wire which is operable through contraction-and-expansion cycles to position said member accordingly.

17. Apparatus as claimed in claim 16, wherein said wire is formed of nitinol.

18. Apparatus as claimed in claim 17, wherein said operating temperature range is limited to a range developing a dimensional change of less than one-half of said maximum amount.

19. Apparatus as claimed in claim 18, wherein said operating temperature range is limited to that developing a dimensional change of less than one-quarter of said maximum amount.

20. Apparatus as claimed in claim 15, wherein said operating temperature range is limited to an amount developing a dimensional change of less than 2% of the overall dimension of said element.

21. Apparatus as claimed in claim 20, wherein said element is a wire.

22. Apparatus as claimed in claim 21, wherein said element is formed of nitinol.

23. Apparatus as claimed in claim 22, wherein said temperature range is limited to an amount developing a dimensional change of less than 1%.

24. Apparatus as claimed in claim 15, wherein said element is under externally produced stress, at all times of its operation, tending to oppose the change in dimension.

25. In carrying out the method of reversibly moving an object by means of an element coupled thereto which is formed of a material subjected to a temperature-responsive martensitic transformation which causes a dimensional change of a predetermined maximum size, and wherein the temperature of the element is controlled so as to control the positioning action thereof;

the improvement wherein the operating temperature range of said element is restricted to that which produces a dimensional change substantially less than said maximum amount, to avoid deleterious permanent elongation of said element as a consequence of successive operational cycles.

26. The method of claim 25, wherein said element is continuously maintained under externally produced tension tending to oppose said change in dimension.

27. The method of claim 26, wherein said element is a wire.

28. The method of claim 27, wherein the dimensional change is restricted to less than one-half of its maximum possible size.

29. The method of claim 28, wherein the dimensional change is restricted to less than one-quarter of its maximum possible size.

30. The method of claim 29, wherein the wire is nitinol.

31. The method of claim 27, wherein the dimensional change is restricted to less than 2% of the length of the wire.

32. The method of claim 31, wherein the dimensional change is restricted to less than 1% of the length of the wire.

33. In prime mover apparatus having an elongate element of material exhibiting a temperature-responsive martensitic transformation which is capable of producing a change in length of a predetermined maximum amount in response to a change in temperature, the apparatus further including means to control the temperature of said element in accordance with an input signal, whereby the element length can be controlled so as to alter the position of an output member over a full-scale range of motion;

the improvement wherein said element is coupled to said output member by means providing said full scale range of motion with a change in length of said element of a predetermined fraction of said maximum amount.

34. Apparatus as claimed in claim 33, wherein said full-scale range of motion is provided by a change in element length of no more than one-half of said maximum.

35. Apparatus as claimed in claim 34, wherein said full-scale range of motion is provided by a change in element length of no more than one-quarter of said maximum.

36. Apparatus as claimed in claim 33, including means to limit the magnitude of the input signal to a magnitude providing a change in element length of said predetermined fraction.

37. Apparatus as claimed in claim 36, including position-responsive means coupled to said member and providing a position feedback signal for comparison with said input signal; and heat control means responsive to the results of said comparison for adjusting the element temperature to that required to position said member at a position corresponding to the magnitude of said input signal.

38. For use in prime mover apparatus having a principal element of material exhibiting a temperature-responsive martensitic transformation which is capable of producing a dimensional change of a predetermined maximum amount in response to a change from a lower operating temperature to a higher operating temperature which is produced by the application to said element of a predetermined amount of heat energy, the apparatus further including means to control the temperature of said element between said lower and higher temperature in accordance with an input signal and means to apply to said element a force tending to resist said change in dimension, whereby the element dimension can be controlled so as to alter correspondingly the position of a member to which said element is operatively coupled;

that improvement wherein said element is prepared for operational use by initially heating it to a temperature substantially greater than that required to achieve said dimensional change of predetermined maximum amount; and concurrently applying to said element, while it is maintained at said greater temperature, a force in a direction opposing said dimensional change.

39. The invention claimed in claim 38, wherein said element comprises a wire which contracts in response to said change from said lower operating temperature to said higher operating temperature; said opposing force being a longitudinal tension force tending to elongate said wire while it is maintained at said greater temperature.

40. The invention claimed in claim 39, wherein said opposing force applied while at said greater temperature is approximately equal to the force applied, during normal operation, to resist said change in dimension.

41. The invention claimed in claim 38, wherein the heat energy input to said wire, in producing said greater temperature, is at least twice the heat energy input required to reach said higher operating temperature.

42. The invention claimed in claim 41, wherein the said heat energy input, in producing said greater temperature, is at least four times the heat energy required to reach said higher operating temperature.

43. Apparatus for producing a visual indication responsive to temperature and comprising:

an element made of an alloy mixture exhibiting a martensitic transformation over a temperature range wherein a variation in temperature in one scale direction produces an internally generated dimensional change of the element and a variation in temperature in the reverse scale direction relaxes the element;

indicator means connected to said element to be moved thereby in response to said changes in dimension;

a scale positioned adjacent said indicator means to provide a visual reading of the position thereof;

input means adapted to receive an input signal and operable to change the supply of heat energy to said element in response to changes in said input signal so as to alter the position of said indicator means;

sensing means for developing a position signal corresponding to the dimension of said element; and feedback means responsive to said position signal and operable to adjust the heat energy supplied to said element so as to cause said indicator means to take a position with respect to said scale corresponding to said input signal.

* * * * *